St. John & Brown.

Street Sweeper.

Nº 18,416.    Patented Oct. 13, 1857.

UNITED STATES PATENT OFFICE.

ISAAC BROWN AND M. W. ST. JOHN, OF LEONARDSVILLE, NEW YORK.

STREET-SWEEPER.

Specification of Letters Patent No. 18,416, dated October 13, 1857.

*To all whom it may concern:*

Be it known that we, ISAAC BROWN and MILTON W. ST. JOHN, of Leonardsville, in the county of Madison and State of New York, have invented a new and Improved Street-Scraping Machine; and we do hereby declare that the following is a full, clear, and exact description of the same, reference being had to the annexed drawings, making a part of this specification, in which—

Figure 1:
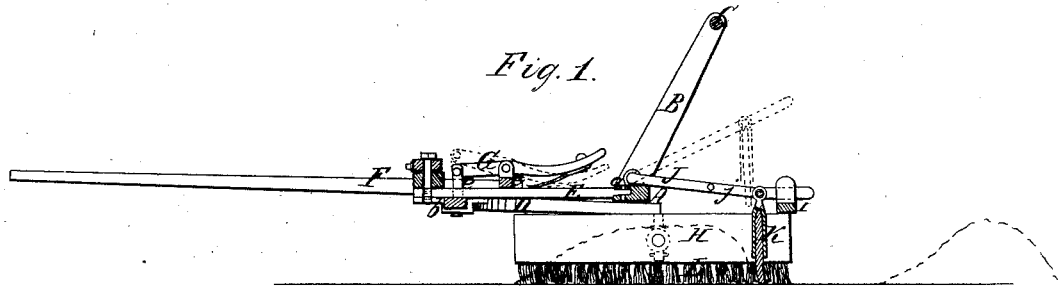
Figure 2:
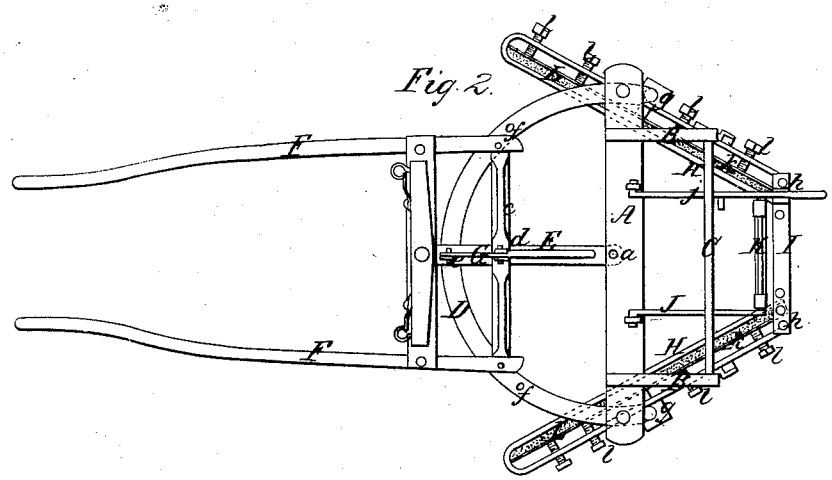
Figure 3:
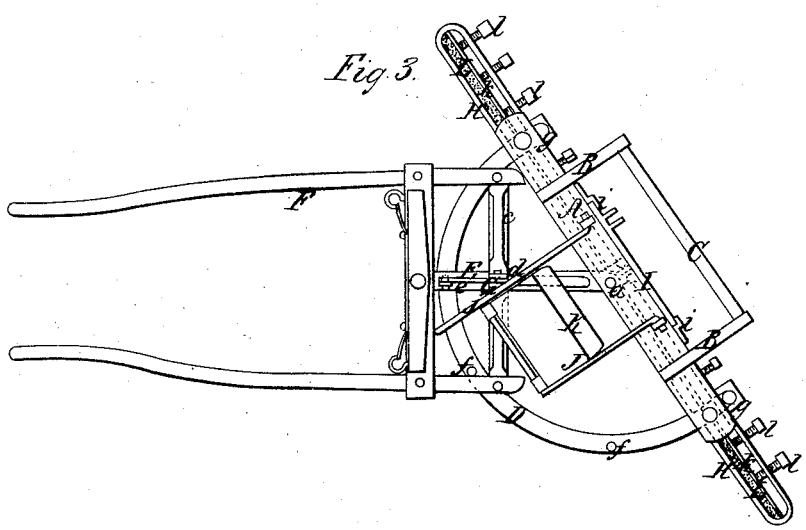

Figure 1 is a longitudinal vertical and central section of our improvement, bisected when in the position shown in Fig. 2. Figs. 2 and 3 are plans or top views of ditto showing the scraper adjusted in different positions.

Similar letters of reference indicate corresponding parts in the two figures.

The object of this invention is to scrape up, either into piles or windrows as may be desired, the greater portion or mass of dirt in streets, so that the remainder of the work may be done in a perfect manner and with the greatest facility either by any of the street sweeping machines in use or by manual labor.

The invention is intended to be used as an auxiliary machine to perform heavy work which cannot be done perfectly by any of the street sweeping machines hitherto devised, nor be performed manually without great labor and expense.

To enable those skilled in the art to make and use my invention I will proceed to describe its construction and operation.

A represents a straight and horizontal bar to which two inclined bars B, B, are attached, one near each end. Said bars B being connected at their upper ends by a cross piece C, which serves as a handle for the operator. The bars A, B, B, may be of wood.

To the bar A a semi-circular metallic bar D is attached. This bar D projects outward at the front side of the bar A, and a radius bar E which is pivoted to the center of the bar A at (*a*) has its outer end fitted on the bar D and is allowed to traverse freely thereon, the outer end of the bar E being provided with an eye (*b*) through which the bar D passes, as shown clearly in Fig. 1.

To the bar E the shafts F of the machine are attached, the back cross bar (*c*) of the shafts being attached to the bar E as shown at (*d*). To the center of the cross bar (*c*) a lever G is pivoted, the outer end of which has a pendent pin (*e*) attached, said pin passing vertically through the eye (*b*) of the bar E and through either of a series of holes (*f*) made through the bar D. By this arrangement it will be seen that the shafts F may be adjusted either at right angles with the bar A as shown in Fig. 2, or obliquely with it as shown in Fig. 3, the shafts being secured in the desired position by the pin (*e*) on the lever G.

H, H, are two oblong metallic sockets or boxes, which are connected at their center by universal joints (*g*) to the ends of the bar A.

The universal joints (*g*) may be arranged in any proper way so as to allow the sockets or boxes H to swing both horizontally and vertically.

The sockets or boxes H, H, are of equal length and may be of cast iron. The inner end of each socket or box H has a vertical pin (*h*) on its upper edge and a pocket or nosing (*i*) is attached to the side of each socket or box H to receive the ends of a bar I which secures the two sockets or boxes in line with each other as shown clearly in Fig. 3, when however the sockets or boxes H, H, are placed in the position shown in Fig. 2, they are connected by placing the bar I on the pins (*h*) as shown in said figure.

To the upper surface of the bar A a frame J is attached by joints or in such a way as to allow said frame to be raised and lowered by the operator, said frame having one of its side pieces (*j*) provided with a handle which when the frame J is in a horizontal position fits between ledges on the upper surface of the bar I. The outer end of the frame J has a pendent gate K, attached to it, which when the frame J is thrown back in a horizontal position will by its own gravity swing in a vertical position.

In the sockets or boxes H, H, stiff brushes L are secured by plates (*k*) and set screws (*l*). These brushes may be formed of wooden splints or any substance which will form a stiff broom or scraper. The brushes or scrapers project a requisite distance below the sockets or boxes H, as shown clearly in Fig. 1.

The operation is as follows: When the sockets or boxes H, H are secured by the bar I in line with each other and the shafts F adjusted obliquely with the bar A as shown in Fig. 3, the brushes or scrapers L will, as the implement is drawn along, scrape the dirt from the point (1) to (2) and leave the dirt in a windrow at (2), and the sockets or boxes are allowed in consequence of their connection to the bar A by the universal joint (g) to adjust themselves to the inequalities of the street. When the sockets or boxes H, H, are adjusted obliquely with each other as shown in Fig. 2, the shafts F are placed or adjusted at right angles with the bar A and the dirt will be scraped in a windrow between the inner ends of the two sockets or boxes and if the gate K be lowered by turning the frame J over backward and the frame and gate raised intermittently by the operator the dirt will be swept up into piles.

By means of this implement the great mass of dirt in a street may be scraped up so that a sweeping machine may finish the work rapidly and perfectly and the implement will leave light work if laborers are employed.

The implement will prove very valuable in the spring as the streets of northern cities are very dirty at that season of the year, the accumulation of the previous winter having to be removed.

Having thus described our invention what we claim as new and desire to secure by Letters Patent, is,

1. The sockets or boxes H, H, provided with brooms or scrapers L and attached to the bar A by the universal joint (g) in combination with the adjustable shafts F attached to the bar A substantially as shown for the purpose set forth.

2. We further claim in combination with the broom, socket or boxes H, and adjustable shafts F the gate K applied to the implement as described and for the purpose specified.

ISAAC BROWN.
M. W. ST. JOHN.

Witnesses:
HENRY B. HARDING,
W. S. GREEN.